United States Patent [19]
Johnson

[11] Patent Number: 5,391,612
[45] Date of Patent: Feb. 21, 1995

[54] HALOGEN-FREE RESILIENT FLOORING

[75] Inventor: Jeffrey Johnson, Lancaster, Pa.

[73] Assignee: Armstrong World Industries, Inc., Lancaster, Pa.

[21] Appl. No.: 82,502

[22] Filed: Jun. 25, 1993

Related U.S. Application Data

[63] Continuation-in-part of Ser. No. 431,384, Nov. 3, 1989, abandoned.

[51] Int. Cl.⁶ ............................................. C08L 33/02
[52] U.S. Cl. ..................... 524/556; 524/563
[58] Field of Search ............... 523/220; 524/556, 524, 524/560, 563, 413, 425, 437, 445

[56] References Cited

U.S. PATENT DOCUMENTS

| | | | |
|---|---|---|---|
| 3,010,899 | 11/1961 | Boyer | 252/29 |
| 3,336,254 | 8/1967 | White | 260/41 |
| 4,191,798 | 3/1980 | Schumacher et al. | 428/95 |
| 4,430,468 | 2/1984 | Schumacher | 524/109 |
| 4,614,680 | 9/1986 | Fry et al. | 428/520 |
| 4,868,053 | 9/1989 | Ohm et al. | 524/437 |
| 4,879,332 | 11/1989 | Saito et al. | 524/556 |

FOREIGN PATENT DOCUMENTS

WO88/00959 2/1988 WIPO.

*Primary Examiner*—Joseph L. Schofer
*Assistant Examiner*—Jeffrey T. Smith

[57] ABSTRACT

A resilient flooring includes a halogen-free, filled, thermoplastic polymer composition. The composition includes a copolymer of ethylene/(meth)acrylic acid and a filler. The composition is substantially free of metal-containing stabilizers and liquid plasticizer, as well as, fibrous material and unsaturated elastomer. The composition may include a modifying resin such as a copolymer of ethylene/vinyl acetate.

16 Claims, No Drawings

HALOGEN-FREE RESILIENT FLOORING

This application is a continuation-in-part of application Ser. No. 431,384, filed Nov. 3, 1989, now abandoned.

FIELD OF THE INVENTION

The present invention is directed to a halogen-free resilient flooring. In particular, the invention is directed to a halogen-free resilient floor tile which is free of metal-containing stabilizers and free of liquid plasticizers.

BACKGROUND OF THE INVENTION

The most frequently used polymers in the preparation of resilient flooring are polyvinyl chloride (PVC) and vinyl chloride copolymers, principally copolymers of vinyl chloride and vinyl acetate. The art of compounding and processing PVC-based compositions is well understood.

The processing and forming of PVC-based compositions is greatly facilitated by the use of plasticizing additives. Esters of phthalic acid, such as di-2-ethylhexyl phthalate (DOP), are commonly used. The use of such plasticizing additives also facilitates the incorporation of high levels (up to about 80% by weight) of fillers and pigments and affords finished compositions with an acceptable degree of flexibility and resiliency.

PVC resins generally require the use of stabilizing additives to prevent discoloration resulting from thermally induced decomposition of the resin during processing. The use of stabilizing additives also helps to prolong the useful life of a PVC-based product by continuing to prevent degradation induced by heat or by light during the service life of the product. These stabilizing additives typically include metal containing compounds such as the barium, zinc, and cadmium salts of organic acids (e.g. stearic acid) and organotin compounds.

The necessary use of these additive materials can create a variety of undesirable problems in composite flooring structures. As one example, in a flooring structure in which a plasticized PVC composition is protected by a clear unplasticized coating, migration of the plasticizer from the PVC composition into the protective clear coating can soften the coating and thereby lessen its protective capabilities.

A second undesirable situation arises from the need to use metal-containing additives. The forced combustion of PVC-based compositions, as in an incinerator, results in the creation of volatile and hazardous metal-containing pollutants.

Other undesirable conditions are also created when PVC-based compositions burn as might occur in a fire situation. The combustion of such materials can result in the evolution of dense smoke which can contribute to a hazardous conditions at times when visibility is important. Furthermore, halogen-containing products of combustion, such as hydrogen chloride, can be formed, thereby adding a further element of hazard to a fire situation.

Halogen-free floor coverings have been proposed such as in White, U.S. Pat. No. 3,336,254. However, such a halogen-free floor covering required an unsaturated elastomer component to impart resiliency and fibers to strengthen and reinforce the floor tile as well as enhance dimensional stability and impact strength.

Schumacher, U.S. Pat. No. 4,430,468, discloses a halogen-free, filled, thermoplastic polymer composition for use in automotive carpets and the backing of the fabric or scrim used to cover the interior panels of an automobile. There is no suggestion in Schumacher of using the composition to form a resilient floor covering. In fact, not all of the compositions disclosed in Schumacher are useful in resilient floor coverings.

It is an object of the invention to provide a halogen-free resilient flooring, thereby eliminating the potential for the formation of hydrogen chloride for other halogenated products and combustion when the floor covering is burned.

It is a further object to provide a flooring which significantly lowers the density of smoke involved in a test such as the NBS Smoke Chamber when compared to floor coverings having comparable PVC compositions.

It is a still further object to provide a flooring free of stabilizing additives containing metals such as tin, zinc, cadmium, and barium. Thereby eliminating metal-containing combustion products.

It is another object of the invention to provide a flooring free of liquid plasticizing compounds such as di-2-ethylhexyl phthalate, thereby eliminating migration of such plasticizer.

SUMMARY OF THE INVENTION

In accordance with the invention, the resilient flooring is made from a halogen-free, filled, thermoplastic polymer composition which utilizes copolymers of ethylene and (meth)acrylic acid. As used herein, "(meth)acrylic acid" means acrylic acid and/or copolymer methacrylic acid. The ethylene content of the ethylene/(meth)acrylic acid should be from about 40% to about 95% by weight.

The floor coverings may be highly filled having about 60% to about 90% by weight of filler or extender. Typical fillers include calcium carbonate, clays, fumed silica and aluminum hydroxide (alumina trihydrate).

Other synthetic thermoplastic resins may be added to facilitate processing and to modify the properties of the final floor covering. For example, a copolymer of ethylene and vinyl acetate may be used as a modifying resin. The ethylene content of the ethylene/vinyl acetate copolymer should be from about 60% to about 91% by weight. Further, conventional pigments to provide desired colors and other additives may be used.

The resilient flooring of the present invention meets the requirements of Federal Specification SS-T-312B (INTERIM AMENDMENT Nov. 14, 1979), which is incorporated by reference. Specifically, the resilient flooring meets the indentation at 73.4° F. (23° C.) test, the indentation at 115° F. (23° C.) test, the residual indentation test, and the volatile loss test. The indentation at 23° C. test requires the resilient flooring to have a minimum indentation of 0.006 inch and a maximum indentation of 0.015 inch after a 30 pound load is applied for one minute through a ¼ inch diameter spherical tip and the flooring is at about 23° C. The residual indentation test requires the resilient flooring to have a maximum residual indentation of 8% after a load of 140 pounds is applied for 10 minutes through a cylindrical tip with a diameter of 0.178 inch and is allowed to recover for one hour under an 8 ounce load applied through a 0.125 inch cylindrical tip and the flooring is at about 23° C.

For most applications resilient flooring structures are required to pass tests intended to reflect their performance in a fire situation. Of the three basic mechanisms commonly employed to impart fire retardancy to plastics compositions, the incorporation of agents which will undergo an endothermic release of water is most appropriate for the present invention. Aluminum hydroxide is the most commonly used of these agents. Other agents that could be considered are magnesium hydroxide, zinc hydroxide and inorganic salts bearing water of hydration as may be appropriate for processing and the requisite fire test.

DETAILED DESCRIPTION

The flooring includes halogen-free compositions which have properties and functional characteristics generally equivalent to those of Type IV vinyl composition tile. The compositions contain thermoplastic synthetic organic resins, singly or in combination, in amounts ranging from about 10% by weight to about 50% by weight of the total weight of composition, preferably about 12% to about 30%. They contain mineral fillers, extenders, and pigments in amounts ranging from about 50% by weight to about 90% by weight of the total composition weight, preferably about 70% to about 88%.

The individual ingredients in a formula may be weighed into a container and the contents of the container charged to an appropriate plastics mixing device. In the mixing device, the resinous portion of the composition is brought to a molten state and the mineral filler and other components are uniformly dispersed throughout the plastic melt.

When dispersion is complete, the homogeneous mass is transferred to the nip of a two-roll mill where it is passed between the mill rolls to form a sheet. Subsequently, the sheet may be passed between the rolls of one, or more, calendering device to provide a smoother surface and to adjust the thickness of the sheet to a desired end value. The sheet may then be allowed to cool as necessary and tiles of a desired size and shape may cut from it using a die or other convenient method.

EXAMPLE 1

One specific embodiment is represented by the formula listed below:

| | |
|---|---|
| Ethylene/acrylic acid copolymer | 8.75 parts by weight |
| Ethylene/vinyl acetate copolymer | 6.75 parts by weight |
| Coarsely ground calcium carbonate | 63.00 parts by weight |
| Finely ground calcium carbonate | 21.00 parts by weight |
| Rutile titanium dioxide | 1.00 part by weight |
| Antioxidant | 0.03 part by weight |

The ethylene content of the ethylene/acrylic acid copolymer was about 94%. The ethylene content of the ethylene/vinyl acetate copolymer was about 75% by weight.

A quantity of the above formula was prepared by weighing the respective ingredients in the above proportions. The total batch was charged into a steam-jacketed Banbury mixer and mixed until the charge reached a temperature in the range of 280° F. to 320° F. The mix was discharged onto a two-roll mill and passed between the rollers to form a discrete sheet approximately $\frac{1}{8}$-inch in thickness. After cooling to approximately ambient temperature, the sheet was die-cut into 9-inch by 9-inch (9"×9") squares.

EXAMPLE 2

A second specific embodiment of the invention is represented by the formula listed below:

| | |
|---|---|
| Ethylene/methacrylic acid copolymer | 15 parts by weight |
| Coarsely ground calcium carbonate | 63 parts by weight |
| Finely ground calcium carbonate | 21 parts by weight |
| Rutile titanium dioxide | 1 part by weight |

The ethylene content of the ethylene/methacrylic acid copolymer was about 94% by weight.

The preparation and processing of this second example followed exactly that described for the first example above. Alternatively, the mixing device was a steam-jacketed, open mixer, less intensive than a Banbury. In all other respects, the procedure and processing remained the same as in the first example.

EXAMPLE 3

A third specific embodiment of the invention is represented by the formula listed below:

| | |
|---|---|
| Ethylene/acrylic acid copolymer | 11.5 parts by weight |
| Coarsely ground limestone | 78.6 parts by weight |
| Aluminum hydroxide | 10.0 parts by weight |
| Rutile titanium dioxide | 1.0 parts by weight |

The ethylene content of the ethylene/acrylic acid copolymer was about 80% by weight.

A quantity of the above formula was prepared by weighing the respective ingredients in the above proportions. The ingredients were stirred by hand to achieve a degree of premixing and the batch was further compounded by milling on a two-roll mill until a homogeneous mixture was achieved. A sheet was obtained by doctoring the mix from the mill roll.

EXAMPLE 4

A further embodiment of the invention is represented by the formula below:

| | |
|---|---|
| Ethylene/methacrylic acid copolymer | 300 parts by weight |
| Calcined Kaolin | 400 parts by weight |
| Calcium carbonate (finely divided) | 265 parts by weight |
| Amorphous silica | 15 parts by weight |
| Rutile titanium dioxide | 20 parts by weight |

The ethylene/methacrylic acid copolymer was the same as that used in Example 2.

Appropriate proportionate quantities of the above ingredients were charged into a steam-heated open mixer and mixed until the homogeneous plastic mass reached a temperature in the range of 260° F. to 280° F. It was then transferred to a two-roll mill and formed into a sheet by passage through the nip of the mill.

EXAMPLE 5

Still another specific embodiment of the invention is represented by the formula below:

| | |
|---|---|
| Ethylene/methacrylic acid copolymer | 150 parts by weight |
| Ethylene/vinyl acetate copolymer | 150 parts by weight |
| Calcined Kaolin | 300 parts by weight |
| Finely ground calcium carbonate | 200 parts by weight |
| Aluminum hydroxide | 160 parts by weight |
| Amorphous silica | 20 parts by weight |

| -continued | |
|---|---|
| Rutile titanium dioxide | 20 parts by weight |

The ethylene/methacrylic acid copolymer was the same as that used in Examples 2 and 4.

The ethylene content of the ethylene/vinyl acetate copolymer was about 75% by weight. In all other respects, the procedure and processing remained the same as in Example 4 above.

What is claimed is:

1. Resilient flooring comprising a halogen-free, filled, thermoplastic polymer composition, said composition comprising an ethylene and (meth)acrylic acid resin, and filler, said composition being halogen-free, the resin of said composition comprising at least 87.5% by weight of the ethylene and (meth)acrylic acid.

2. The flooring of claim 1 wherein the composition is free of metal-containing stabilizing additives.

3. The flooring of claim 1 wherein the composition is free of liquid plasticizer additives.

4. The flooring of claim 1 wherein the filler comprises particles having two size distributions.

5. The flooring of claim 1 wherein the composition comprises about 10% to about 30% by weight of copolymer and about 60% to about 90% by weight of filler.

6. The flooring of claim 1 wherein the composition is free of fibrous material.

7. The flooring of claim 1 wherein the composition is free of unsaturated elastomeric additives other than the ethylene and (meth)acrylic acid resin.

8. The flooring of claim 1 wherein the flooring is a tile, the tile being halogen-free, the tile being homogeneous.

9. Resilient flooring comprising a halogen-free, filled, thermoplastic polymer composition, said composition comprising an ethylene and (meth)acrylic acid resin, and filler, said composition being halogen-free, the resin of said composition comprising at least 87.5% by weight of the ethylene and (meth)acrylic acid, said resilient flooring having a minimum indentation of 0.006 inch and a maximum indentation of 0.015 inch after a 30 pound load is applied for one minute through a ¼ inch diameter spherical tip and the flooring is at about 23° C.

10. The flooring of claim 9 wherein the composition comprises about 10% to about 30% by weight of copolymer and about 60% to about 90% by weight of filler.

11. Resilient flooring comprising a halogen-free, filled, thermoplastic polymer composition, said composition comprising an ethylene and (meth)acrylic acid resin, and filler, said composition being halogen-free, the resin of said composition comprising at least 87.5% by weight of the ethylene and (meth)acrylic acid, said resilient flooring having a maximum residual indentation of 8% after a load of 140 pounds is applied for 10 minutes through a cylindrical tip with a diameter of 0.178 inch and is allowed to recover for one hour under an 8 ounce load applied through a 0.125 inch cylindrical tip and the flooring is at about 23° C.

12. The flooring of claim 11 wherein the composition comprises about 10% to about 30% by weight of copolymer and about 60% to about 90% by weight of filler.

13. The resilient flooring of claim 1 wherein the resilient flooring meets the requirements of Federal Specification SS-T-312B (INTERIM AMENDMENT Nov. 14, 1979).

14. The flooring of claim 1 wherein the resin of the composition is at least 3% by weight of (meth)acrylic acid.

15. The flooring of claim 9 wherein the resin of the composition is at least about 3% by weight of (meth)acrylic acid.

16. The flooring of claim 11 wherein the resin of the composition is at least about 3% by weight of (meth)acrylic acid.

* * * * *

UNITED STATES PATENT AND TRADEMARK OFFICE
CERTIFICATE OF CORRECTION

PATENT NO. : 5,391,612
DATED : February 21, 1995
INVENTOR(S) : Jeffrey Johnson

It is certified that error appears in the above-identified patent and that said Letters Patent is hereby corrected as shown below:

Claims 15 and 16 at column 6, lines 35 and 38, the word "about" should be deleted.

Signed and Sealed this

Eighteenth Day of April, 1995

Attest:

BRUCE LEHMAN

Attesting Officer

Commissioner of Patents and Trademarks